United States Patent [19]

Sasabe et al.

[11] 3,912,860

[45] Oct. 14, 1975

[54] IMAGE DISPLAY SYSTEM

[75] Inventors: Kaoru Sasabe, Ikeda; Heijiro Hayami, Tokyo, both of Japan

[73] Assignee: Matsushita Electric Industrial Co., Ltd., Kadoma, Japan

[22] Filed: June 10, 1974

[21] Appl. No.: 477,912

Related U.S. Application Data

[63] Continuation-in-part of Ser. No. 255,251, May 22, 1972, abandoned.

[52] U.S. Cl. ........ 178/6.8; 178/DIG. 31; 179/2 DP; 178/18

[51] Int. Cl.[2] ........ H04N 7/18

[58] Field of Search ........ 178/6.8, 7.87, DIG. 31, 178/DIG. 22, 18–20; 179/2 DP; 250/217 CR; 313/375, 465; 350/160 P

[56] References Cited

UNITED STATES PATENTS

| | | | |
|---|---|---|---|
| 3,148,281 | 9/1964 | Fyler | 250/217 CR |
| 3,271,515 | 9/1966 | Harper | 250/217 CR |
| 3,413,410 | 11/1968 | Farmer | 358/72 |
| 3,668,312 | 6/1972 | Yamamoto | 340/324 A |

*Primary Examiner*—Howard W. Britton
*Attorney, Agent, or Firm*—Stevens, Davis, Miller & Mosher

[57] ABSTRACT

An image display system comprising one or more electron tube and an optical pen disposed in front of the electron tube, the electron tube having a face plate provided with a cathode chromic material and a fluorescent material, in which the cathode chromic material and the fluorescent material are bombarded by an electron beam to produce color center and fluorescence respectively for the display of an image. The optical pen detects light generated as the face plate is scanned by the electron beam and the electron beam scanning the face plate is controlled in accordance with the output of the optical pen thereby to render the cathode-chromic material colored by the bombardment of the controlled electron beam.

7 Claims, 15 Drawing Figures

IMAGE DISPLAY SYSTEM

CROSS-REFERENCE TO RELATED APPLICATION

This application is a continuation-in-part of application Ser. No. 255,251, filed May 22, 1972, and now abandoned.

BACKGROUND OF THE INVENTION

1. Field of the Invention

This invention relates to image display systems for displaying hand-written characters, graphs and drawings on electron tubes and, more particularly, to image display systems using an electron tube utilizing the cathode-chromy phenomenon for the high contrast display of an image on the tube.

2. Description of the Prior Art

A conventional image display system for displaying hand-written characters or the like on an electron tube has a net-like arrangement of many insulated conducting lines arranged in mutually crossing two groups respectively in parallel with X and Y coordinates. The movement of a pen on the surface of the net-like arrangement causes cross points of the two groups of conducting lines to be successively conductive along the trace of the pen and X and Y coordinate signals corresponding to each of the cross points are produced for displaying on the electron tube as a series of bright spots. Such a display system is inevitably complex.

SUMMARY OF THE INVENTION

It is an object of the invention to provide an image display system in corporating an electron tube utilizing the cathode-chromy phenomenon for simply and efficiently displaying hand-written characters or the like on the tube.

Another object of the invention is to provide an interstation image display system for transmitting and receiving a displayed image between at least two display stations connected by a communication line.

An image display system, in accordance with the invention, includes an electron tube for displaying hand-written characters or the like and an optical pen. The electron tube is provided with a cathode-chromic material and a fluorescent material on the inner surface of the tube plate and the cathode-chromic material produces color centers when bombarded by an electron beam. The optical pen disposed in front of the electron tube detects light generated as the fluorescent material is scanned by the electron beam and produces an output signal. The output signal of the optical pen controls the electron beam so as to bombard the cathode-chromic material to thereby display a trace of the optical pen.

DESCRIPTION OF THE PREFERRED EMBODIMENT

Figure 1:
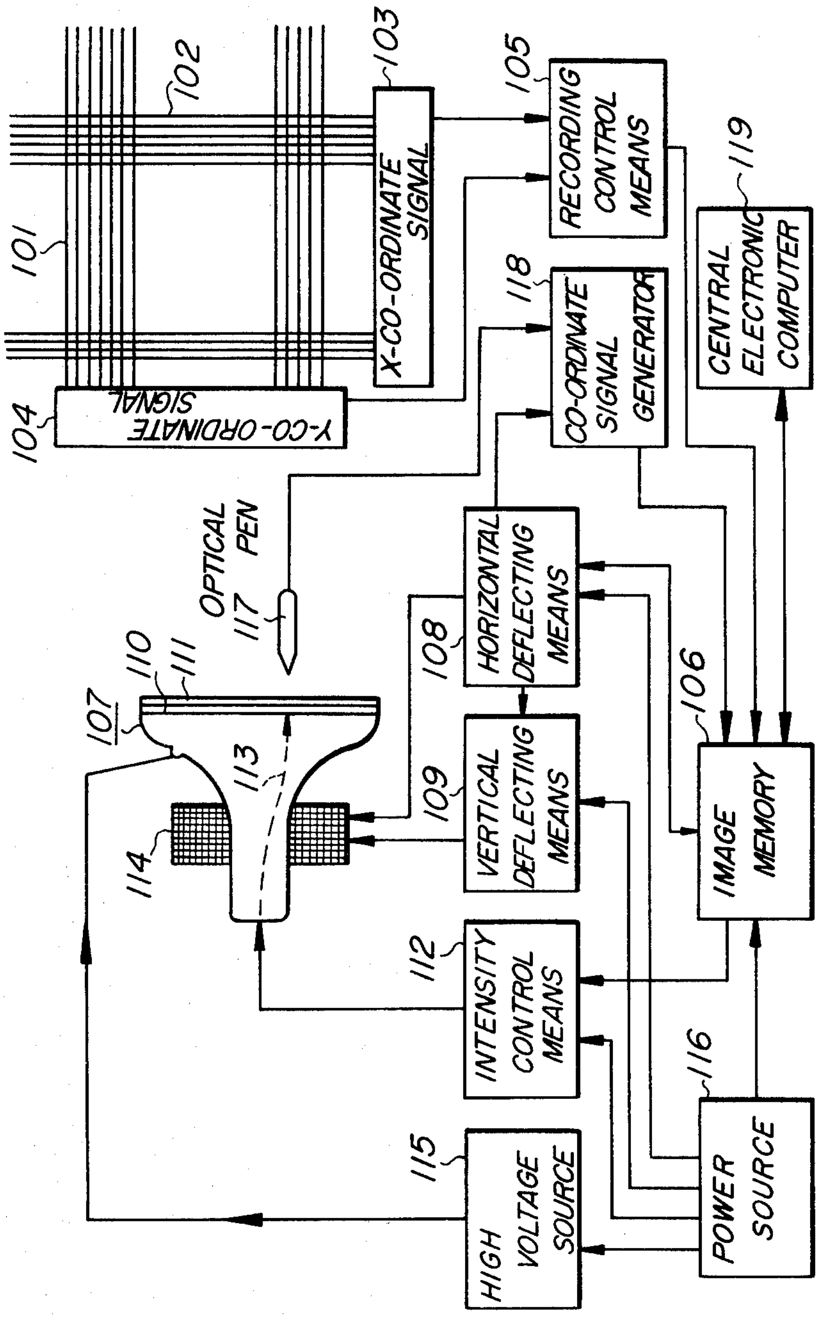
FIG. 1 PRIOR ART
FIG. 1 is a schematic representation of an example of the prior art image display system.

One type of the prior art image display system for displaying hand-written characters and other scripts on a cathode-ray tube has a construction as shown in FIG. 1. In this system, as one scribes a character or any other drawing on a net-like arrangement of many insulated conducting lines arranged in mutually crossing groups 101 and 102, bright spot co-ordinate signals corresponding to the moving pen pressure point and representing the co-ordinates of the bright spot on the cathode-ray tube 107 are generated from X- and Y-co-ordinate signal generaters 103 and 104 and coupled through a recording control means 105 to an image memory 106 to be stored therein. In the display tube 107, its screen 110 is scanned by an electron beam controlled by horizontal and vertical deflecting means 108 and 109 according to the memory content, whereby the script image can be displayed and observed through the tube face plate 111. The intensity of luminescence is made to vary in proportion to the input voltage supplied to an intensity control means 112. The intensity control means 112 is controlled according to the content of the memory 106, so that the position of the tube screen corresponding to the pen pressure point on the conductor arrangement glows. To the memory 106 is also coupled a central electronic computer 119 for the display of various images. Numeral 114 designates a deflecting coil controlled by the deflecting means 108 and 109, numeral 115 a high voltage source, and numeral 116 a power source.

Another form of the prior art image display system uses an optical pen 117 sensitive to the glowing of the screen 110. In this system, from the luminescence at the position at which the optical pen touches the tube face plate 111, a co-ordinate signal generator 118 detecting the X and Y co-ordinates of the pen position provides output similar to that obtained from the recording control means 105 to the memory 106. Then, through a similar sequence of events as mentioned the image is displayed on the display tube 107.

Figure 2D:
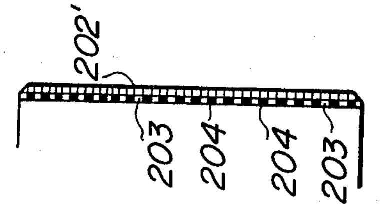
FIGS. 2*a*, 2*b*, 2*c*, 2*d* and 2*e* show, in pictorial elevational and sectional views, examples of the display tube employed in the image display system according to the invention.
Figure 2B:
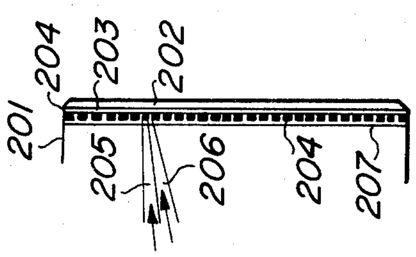
Figure 2A:
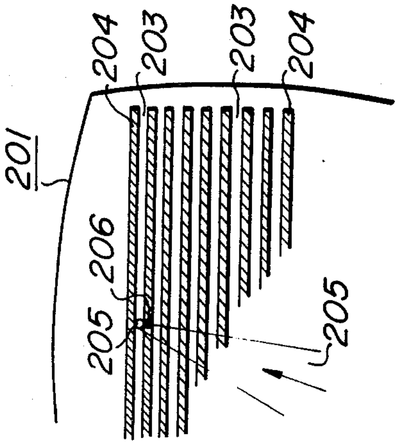
Figure 2C:
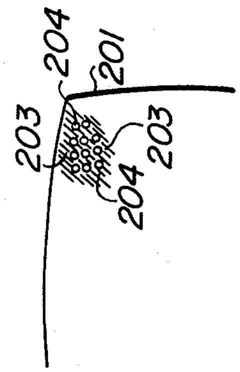
Figure 2E:
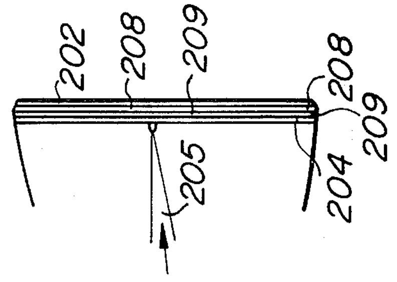

FIGS. 2*a* to 2*e* show examples of the electron tube which is the basic element of the system according to the invention. In an example shown in FIG. 2*a*, a face plate 202 of the tube 201 is provided on the inner side with a recording film 203 of a cathode chromic material such as sodalite which is colored resulting from the bombardment thereof with an electron beam, on the inner side of which is in turn formed a fluorescent screen 204 chiefly serving to have the optical pen to produce detection signals. A beam 205 of electrons shot from an electron gun in the direction of the arrow scans the screen 204 in a manner as in the scanning in television, causing raster on the front of the tube 201. FIG. 2*a* shows the arrangement of the screen 204 and recording film 203 viewed from the side of the electron gun. Shown in FIG. 2*b* is a sectional view of the same arrangement. Shown in FIG. 2*c* is another example, in which the screen 204 and recording film 203 are in the form of numerous dots. The face plate may be scanned by a single electron beam as shown in FIG. 2*a* or it may be scanned by two electron beams 205 and 206 as shown in FIG. 2 *b*. In the latter case, it is possible to have one electron beam to scan the screen 204 and the other electron beam to scan the recording film 203 so as to provide for two separate functions of display and recording as will be described hereinafter. A metal back treatment film 207 may be formed on the back of the screen 204 and recording film 203. Also, an optical fiber arrangement as shown in FIG. 2*d* may be substituted for the face plate. In this case, resolution of drawings drawn with the optical pen may be improved.

While it may be thought of to have the screen 204 in the form of a film overlaid on the recording film 203, in this case the electron beam bombardment control high voltage should be varied to vary the electron beam energy so as to switch the screen 204 and recording film 203 extremely quickly, which is very difficult. Also, with a two-layer structure electrons will not directly impinge upon one of the layers, so that inferior resolution results. The invention provides improvements over these disadvantages.

Figure 3:
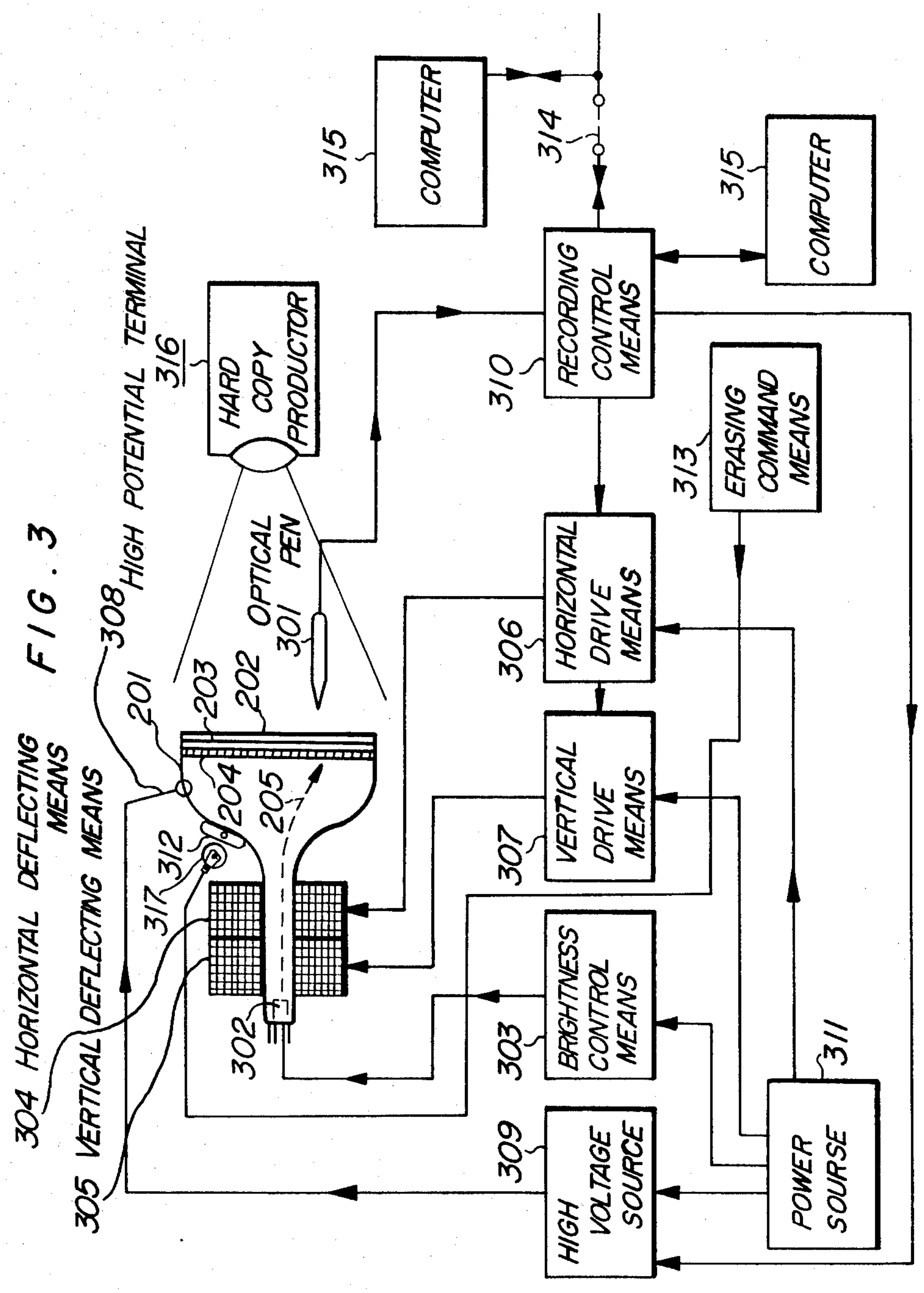
FIG. 3 is a schematic representation of an embodiment of the image display system according to the invention.

An embodiment of the picture display system according to the invention will now be described with reference to FIGS. 3 and 4. Referring to FIG. 3, reference numeral 201 designates an electron tube described above in connection with FIGS. 2*a* to 2*e*. Provided in front of the electron tube 201 is an optical pen 301, which may touch the face plate 202 at any position thereof. The optical pen 301 is provided with an photoelectric converting element. It is sensitive to the luminescence of the tube 201 and generates an electric signal in response to the luminescence. An electron beam 205 from an electron gun 302 is controlled by a brightness control device 303 and scans the fluorescent screen 204 so as to glow. The brightness or intensity of fluorescence of the fluorescent screen 204 is suitably set so that the fluorescence may be sensed by the optical pen 301 through the recording film 203. The electron beam 205 is deflected television-wise by horizontal and vertical deflecting means 304 and 305 driven by respective horizontal and vertical drive means 306 and 307. The horizontal and vertical deflecting means 304 and 305 may be in the form of a coil or an electrostatic deflection type deflecting plate. The electrons generated in the electron gun 302 of course proceeds in the direction of a high potential anode held at the potential of a high potential terminal 308, on which is impressed a high voltage produced from a high voltage source 309, and the electrons are accelerated by this voltage strike fluorescent body to cause fluorescence thereof.

In order to write in the recording film 203 in accordance with, for instance, the output signal of the optical pen 301, the output of the optical pen is coupled through a recording control means 310 to the horizontal drive means 306 to control the target of the electron beam so that electrons enter the film 203, thereby irradiating the recording film 203 for recording.

Figure 4:
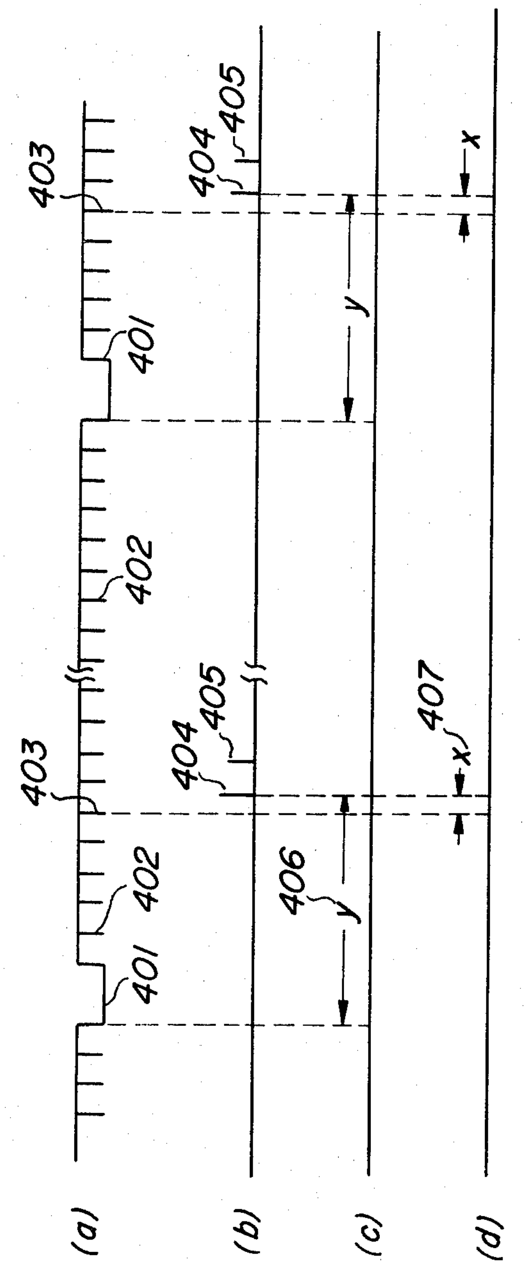
FIG. 4 is a time chart to illustrate the operation of the system of FIG. 3.

FIG. 4 shows the operation of the system described above. It is a time chart with abscissa taken for time. FIG. 4, (*a*) in an imitative view of vertical synchronizing signal 401 and horizontal synchronizing signal 402. In accordance with the Japanese television system, the signal 401 is a pulse series at repetition frequency of 60 Hz, and the signal 402 is a pulse series at a repetition frequency of 15.75 kHz. The spot of constant brightness scans the fluorescent screen 204 from the top left of the screen. If the optical pen is located on raster 403, for instance, it responds to the spot coming to this point, whereby it produces a pen pulse 404. If the light receiving tip of the optical pen spans the line 403 and the next line, a second pulse 405 lagging the first one by 1H = 63.5 sec. is also produced. The time from the appearance of the pulse 401 till the appearance of the pen output pulse 404, i.e., the Y axis time interval $y$ (406), and the time from the appearance of the horizontal sync. pulse 403 till the pulse 404, i.e., the X axis time interval $x$ (407), correspond to the co-ordinates of the position of the beam spot 205 and the pen tip 301. Thus, it will be seen that the same X and Y coordinates hold for a plurality of electron tubes belonging to the same system as the tube 201 and synchronized to the same vertical and horizontal sync. signals 401 and 402.

Referring again to FIG. 3, the output signal from the optical pen 301 is amplified by the recording control means 310 to control vertical and horizontal drive means 306 and 307 and high voltage source 309. In this embodiment, immediately the optical pen produces a response signal, the voltage of the high voltage source 309 is increased by the recording control means 310 to momentarily shift the scanning beam spot to the recording film 203, and the spot is returned to the original course upon cessation of the optical pen output. In this manner, a color center is created through light absorption at a portion of the recording film corresponding to the position of the optical pen tip. As the tip of the optical pen 301 is moved over the face plate 202, the electron beam is projected onto the recording film every time the optical pen produces an output pulse, that is, once for every 1/60 second. Thus, various drawings may be depicted according to the trace of the optical pen 301. Since the light absorption is effected while the screen 204 is weakly luminant, the drawing may be seen with high contrast. Also, by virture of the light absorption any recorded character or drawing may be seen even in the cut-off state of power source 311 by projecting light onto the front face of the face plate 202. The intensity of the electron beam 205 for scanning the fluorescent screen 204 is selected such that no color center will be created in the recording film 203.

Figures 5, 6:
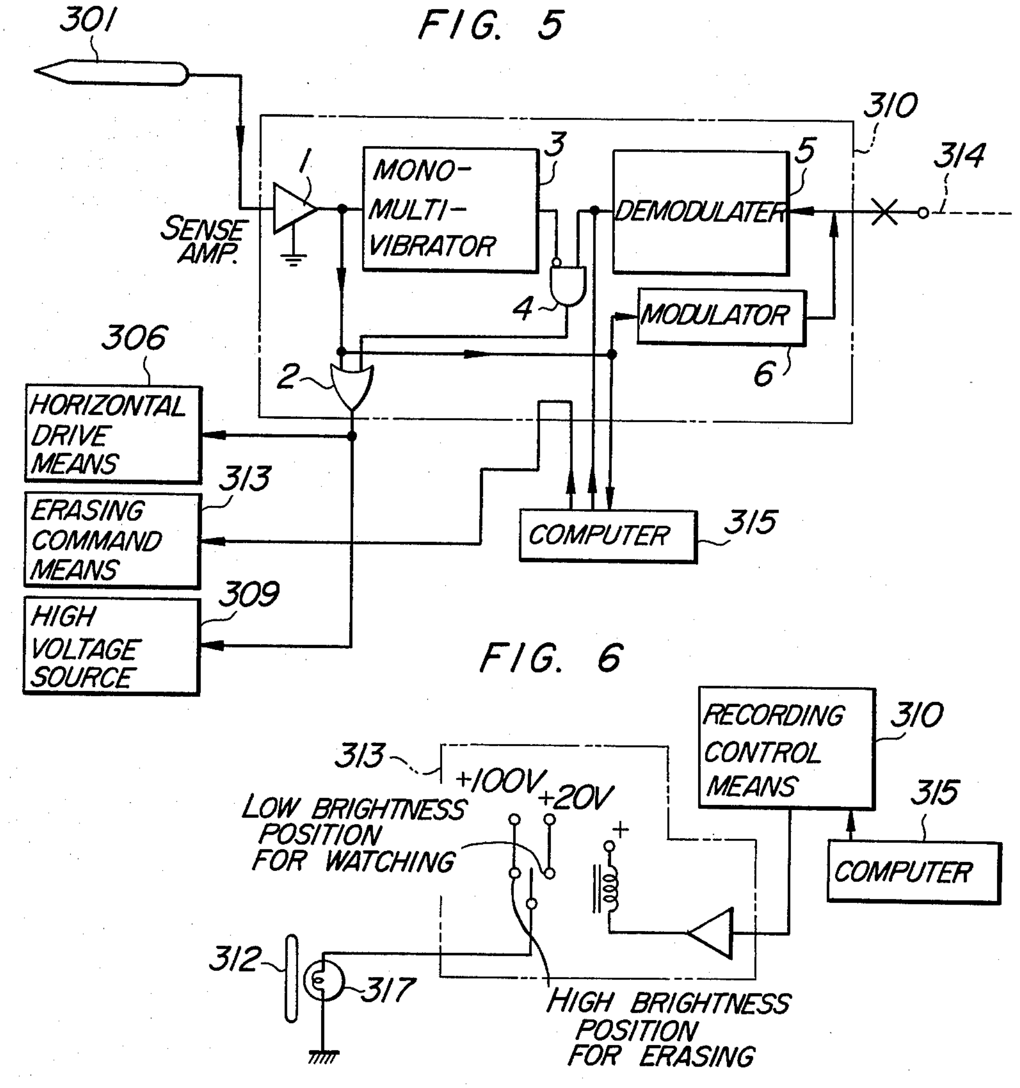
FIG. 5 is an example of circuit arrangement of a recording control means incorporated in the image display system of FIG. 3.
FIG. 6 is a circuit arrangement of an erasing command means incorporated in the image display system of FIG. 3.

An example of the circuit arrangement of Recording Control Means 310 is shown in FIG. 5. In operation, a recording is made on the tube 201 when an optical pen 301 senses a luminescence of the tube 201 and generates an electric signal in response to the luminescence. The electric signal from the optical pen 301 is applied to the recording control means 310 and is amplified and wave-shaped by a sense amplifier 1; then a pulse signal from the sense amplifier 1 is delivered through an OR gate to the horizontal drive means 306 and high voltage source 309.

In the horizontal drive means 306, the pulse signal from the recording control means 310 is superimposed on the conventional vertical sync. signal which has a saw tooth shape.

Referring to FIG. 5, a demodulator 5, a modulator 6, mono-multivibrator 3 and AND gate 4 will not be necessary where no incoming signal to be displayed is delivered through a line 314. However, in a system where some incoming signals from other sources are also desired to be displayed, and where the optical pen 301 is sensing the luminescence of the tube 201, an incoming signal through the line 314, which is demodulated by the demodulator 5, is then interrupted by the AND gate 4 for a time period which corresponds to the width of a pulse generated by the mono-multi-vibrator 3. Thus, the incoming signal from line 314 is not delivered to the OR gate 2 while a pulse is present at the output of mono-multi 3.

The computers of other CRT display systems may be programmed to transmit the interrupted signals repeatedly after the interruption has been released. On the other hand, an outgoing signal generated by the optical pen 301 is modulated by the modulator 6 and transmitted through the line 314 to other CRT display systems or computers.

In a different design, another electron gun may be provided separately from the electron gun 302, so that a separate electron beam may be provided for recording independently of the electron beam 205 only when the optical pen produces an output.

Further, the recoding film 203 and fluorescent screen 204 may be formed in the form of numerous dots for irradiation with separate beams.

The cathode chromic material such as sodalite is usually susceptible to recording effects by ultra-violet rays as well as by electrons, but the erasure may be made with visible waves of 4,000 to 6,000 Angstroms. Accordingly, the erasing may be done by projecting erasing light emitted by a lamp 317 under the control of erasing command means 313 onto the film 203 through a light window 312 provided in the rear funnel of the tube 201. Also, it may be done by increasing the intensity of fluorescence of the fluorescent screen 204 through manual or automatic control of an erasing command means 313 to control a brightness control means 303 so as to destroy color centers formed in the recording film 203. Further, both these methods may be used in combination. Furthermore, the erasing light may be projected onto the front face of the face plate 202. With these erasing methods, the erasing efficiency is different. Moreover, depending upon the material of the recording film a thermal method may be employed for erasing. More particularly, the erasure may also be made by directing external infrared rays or by means of a transparent heater provided inside the tube in the proximity of the face layers 202 and 203.

FIG. 6 illustrates a preferred circuit for erasing command means 313. Only that portion is shown which functions to destroy color centers formed in the recording film 203 by projecting erasing light emitted by a lamp 317 under the control of erasing command means 313 onto the film 203 through a light window 312 provided in the rear funnel of the tube 201. An erasing command signal is initiated by an optical pen 301 or a computer 315 and this command signal is applied to the erasing command means 313 through the recording control means 310. When the erasing signal is applied to the erasing command means 313, the two-position switch shown in FIG. 6 is switched to the high brightness position for erasing and the lamp 317 located adjacent the erasing window 312 is energized with a much higher voltage source, for example, +100V instead of +20V as shown in FIG. 6. The lamp 317 is normally energized with a low voltage source of +20V for displaying and recording.

The other erasing function of the erasing command means 313 is to control the brightness control means 303 so as to destroy color cneters formed in the recording film 203. This erasing operation is explained in the following paragraph in connection with the circuit of the brightness control means 303.

The former erasing function performed by means of a lamp 317 is effective where a screen layer provided on the inner side of the faceplate is composed of a plurality of fluorescent material areas enclosed by a cathode chromic material area in a plane. The latter erasing function, on the other hand, performed through the brightness control means 303, is effective where the screen layer is constructed by piling up a fluorescent material layer and a cathode chromic material layer.

The erasing command signal may be initiated by the computer 315, if the computer is programmed in such a way that when the optical pen 301 points to a particular coordinate position on the surface of the electron tube, for example, an extreme right hand corner of the surface of the electron tube, an erasing command signal is produced.

Figure 7:
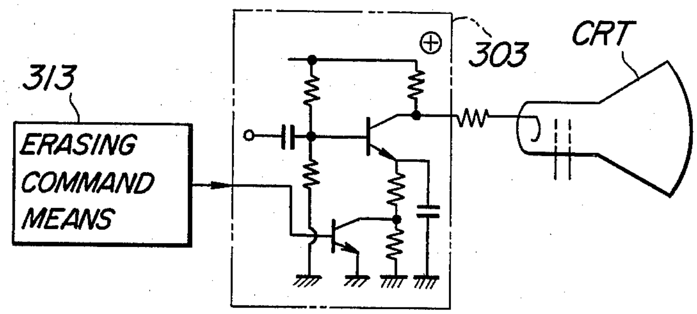
FIG. 7 is a circuit arrangement of a brightness control circuit incorporated in the image display system of FIG. 3.

The circuit shown in FIG. 7 is similar to the brightness control circuit of usual TV receivers. However, the brightness control means 303 is only required to have two brightness levels, that is to say, a bright level and a dark level. These two brightness levels are switched by changing the impedance of the emitter circuit connected to the cathode of a CRT tube, to either a low impedance or a high impedance in accordance with the signal from the erasing command means 313.

The material of the fluorescent screen 204 should have spectral characteristics matched to the photoelectric element of the optical pen 301. If a non-visible spectral characteristic is selected, there will be no objectionable fluorescence of the fluorescent screen 204. Also, a similar tube may be constructed by combining the screen 204 and recording film 203. In this case, the amplification degree of an amplifier included in the brightness control means 303 may be adjusted to obtain positive feedback of the optical pen output, so that color centers may be produced in the cathode-chromic material with increased electron beam energy.

Sodalite as the cathode chromic material of the fluorescent screen is represented by the general formula $Na_6Al_6Si_6O_{24}2NaCl$. If $Na_6Al_6Si_6O_{24}NaCl½Na_2SO_4$ is substituted, the manufacture may be simplified, so that it is possible to inexpensively obtain a display tube. Also, if static picture and motion picture are recorded in the system of FIG. 3, the static picture may be displayed on the recording film 203 and motion picture on the fluorescent screen 204. Further, if the deflecting means 304 and 305 of the tube 201 are used for the purpose of waveform observation through a synchroscope and the like, the ordinary display may be made on the fluorescent screen 204 and the static recording on the recording film 203. Furthermore, the display on the screen 204 may be superimposed on a static waveform recorded on the recording film. Moreover, hard copies may be produced through a hard copy producer by writing data with the optical pen 301.

In the preceding embodiment, a single electron tube 201 is used much as a blackboard. According to the invention, two or more tubes may be used in the same synchronous system by combining them through line 314 in FIG. 3. In this case, drawings written in one tube may be displayed on the recording film 203 of all the tubes. Also, a computer 315 may be incorporated and arranged such that it is controlled by the signal from the optical pen 301 to display specified characters and drawings recorded in it on the electron tube 201. In this case, it is possible to permit supplementing desired character or drawing on the displayed picture with the optical pen 301 through the recording control means 310. Further, the recording control means 310 itself may be controlled according to any specified position of the optical pen 310 on the electron tube 201 and the computer 315.

Figure 8:
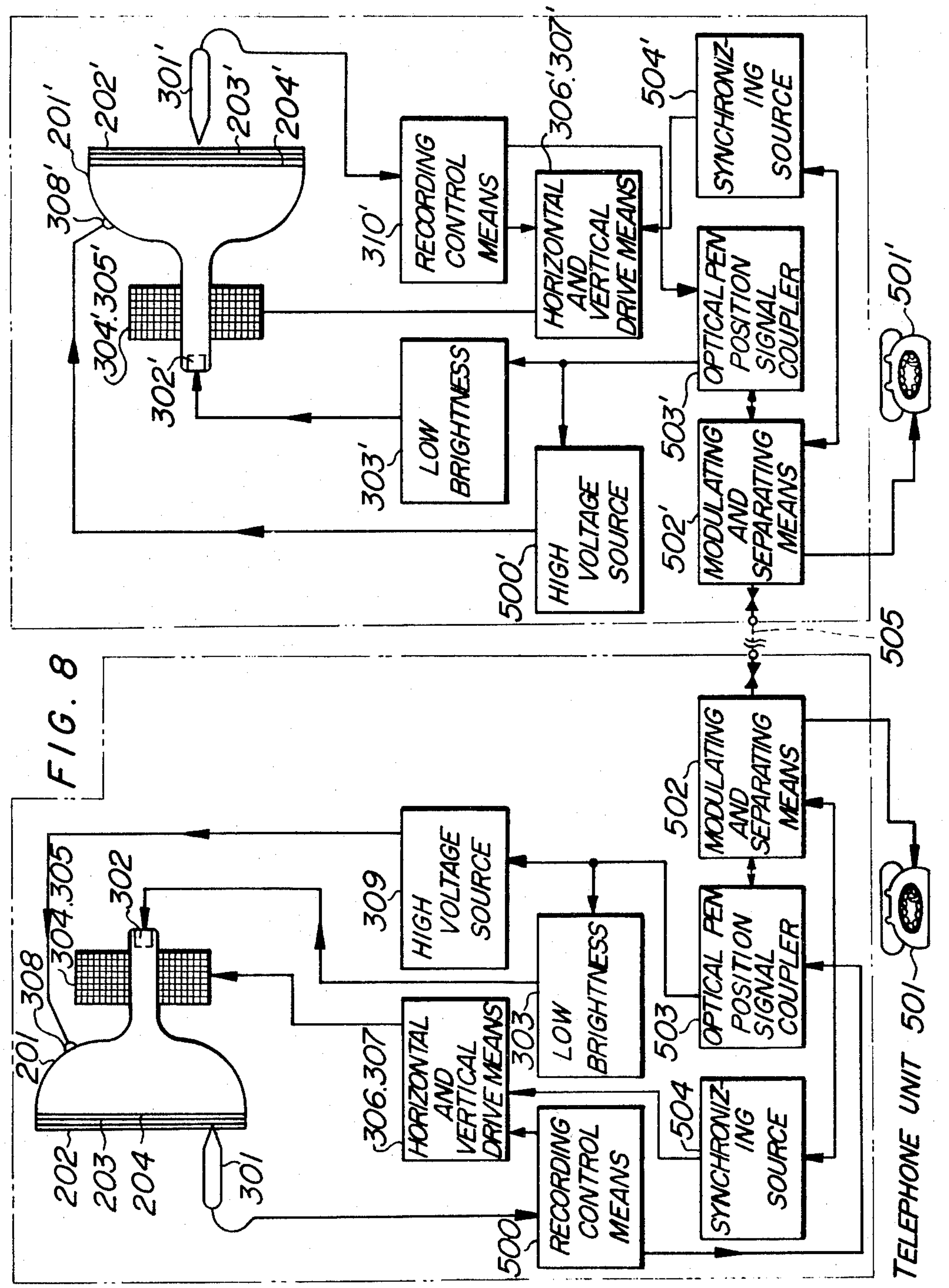
FIG. 8 is a schematic representation of an image display communication system embodying the invention.
Figure 9:
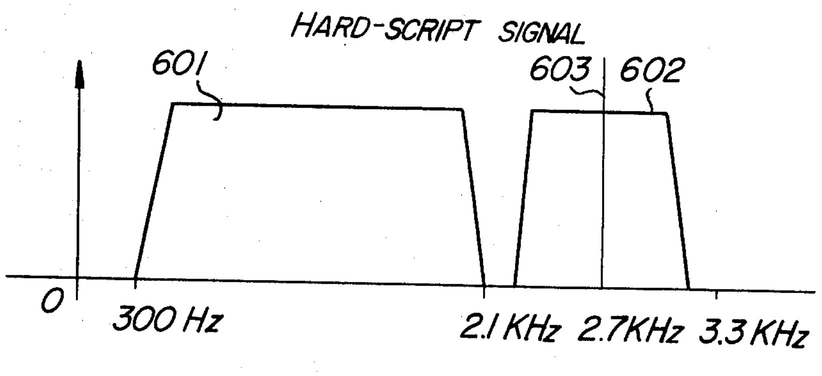
FIG. 9 is a graph showing bandwidth requirements for the system of FIG. 5.
Figure 10:
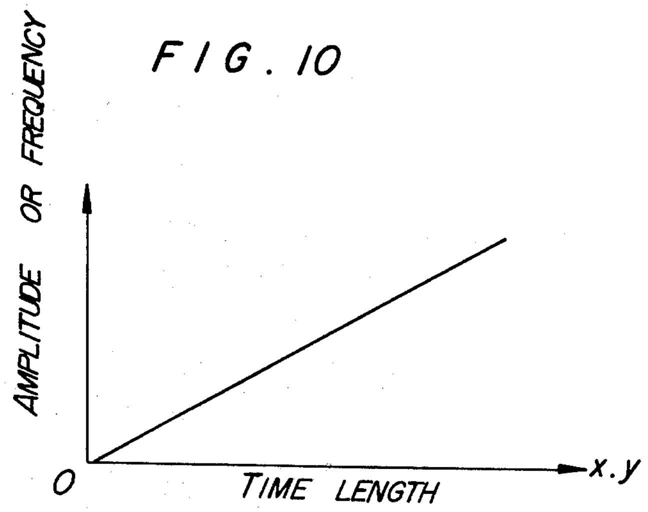
FIG. 10 is a graph showing an operational characteristic of the system of FIG. 5.

FIG. 8 shows a system including a plurality of synchronous tubes embodying the invention. In the Figure, numerals with a prime designate like parts designated by the same numerals but without any prime. Also, corresponding parts to those is FIGS. *2a* to *2e* and FIG. 3 are designated by identical reference numerals. In this embodiment, the line 505 may be a CATV network. Where hand-written characters and drwings are involved, the generation of signals is less frequent, and the drawings are usually not so fine, so that the required bandwidth is usually several kHz. Thus, usual telephone line may be used for the line 505. In this case, the vertical sync. signal 60 Hz may be transmitted by modulating it on a separate carrier at a frequency within the telephone line band of 300 to 3,400 Hz, for instance 2.7 kHz. By so doing, the horizontal sync. signal 15.75 kHz may be produced on the basis of the phase of the vertical sync. signal 60 Hz, whereby absolute synchronization of both vertical and horizontal scanning may be obtained. Alternatively, it may be wise to adopt the independent synchronization system as is employed in the usual facsimile transmission system. Further, it may be thought of to space the hand-script signal band from the telephone line band, as shown in FIG. 9. For example, the telephone line band 601 may extend between 300 Hz and 2.1 kHz and the hand-script signal band 602 may extend between 2.1 kHz and 3.3 kHz. For the efficient transmission of the latter signal 602, a carrier wave 603 is used. The signal 602 may be frequency modulation, amplitude modulation of vestigial side-band modulation. Turning back to FIG. 8, a telephone unit 501 employing the band 601 for communication is coupled to a demodulating and separating means 502 to separate optical pen position signals, sync. signals and telephone signal. The modulating and separating means 502 is coupled to an optical pen position signal coupler 503 including switching circuits so that the observer can make connection control to selectively have only his own drawn patterns or only patterns drawn by a companion observer at another unit or both these patterns displayed on the tube 201. Synchronization is obtained through a synchronizing source 504, to which the companion party's sync. signals are coupled. Of course, the observer at the unit 501 may freely dial or be dialed from any other remote companion observer. Co-ordinate pulses corresponding to the co-ordinates of the optical pen 301 on the tube 201 are converted through the recording control means 500 into corresponding X- and Y-axis signals. The X or Y time length may be converted to a corresponding binary digital signal through a pulse series at a constant frequency permitted during this time interval. Alternatively, it may be converted into an analog signal through an integrating circuit, or it may be converted into a frequency signal through a sweep oscillator. FIG. 10 shows the relation between the amplitude or frequency of the converter output and the input time length. Thus, the output may take any form so long as the input-output relation is linear. Moreover, it is possible to employ a non-linear relation for the distorted display or original drawings and the like as perspective views.

Figure 11:
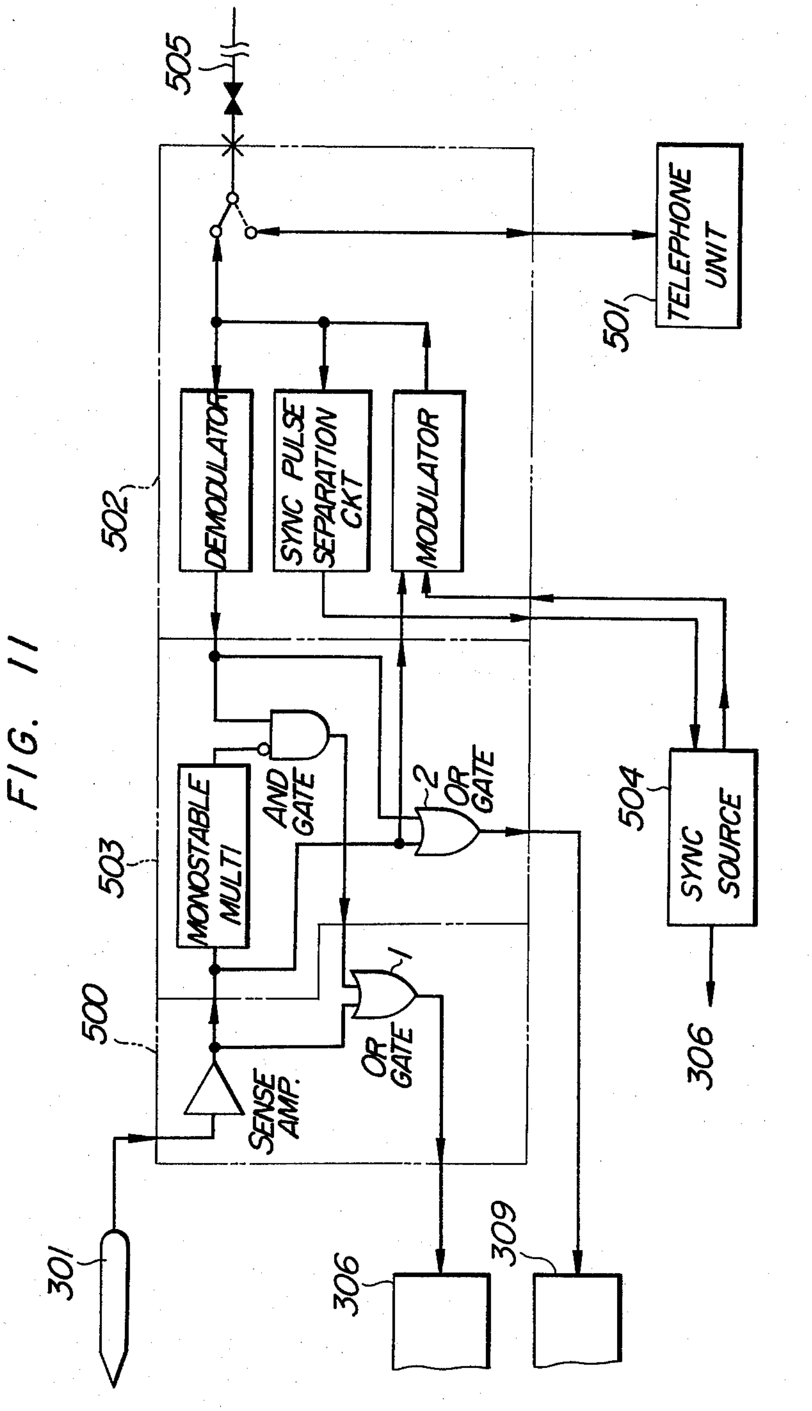
FIG. 11 is a circuit arrangement of a recording control means, modulating and separating means and optical pen position signal coupler incorporated in the image display communication system of FIG. 8.

FIG. 11 shows a circuit arrangement of a recording control means 500, modulating and separating means 502 and optical pen position signal coupler 503 of FIG. 8. This circuit arrangement is similar to that of recording control means 310 of FIG. 5 and the operation of the two systems is therefore analogous. Between the modulating and separating means 502 and the optical pen position signal coupler 503, an outgoing signal and an incoming signal is transmitted and received. In other words, a signal from the optical pen in one display system is delivered from signal coupler 503 to the modulator of 502, and an incoming signal from the other display system is received through the demodulator of 502.

Between the snychronzing source 504 and the modulating and separating means 502, during reception of a signal from the other display system, horizontal and vertical sync. signals are demodulated and synchronized in unit 502, whereas during transmission of a signal from the optical pen 301, the signal to be transmitted is combined with a sync. signal generated by source 504.

What is claimed is:

1. An image display system, comprising:

an electron tube having a face plate provided on the inner side thereof with a screen layer, said screen layer being composed of a plurality of fluorescent material areas enclosed by a cathode chromic material area in a plane, said cathode chromic material producing color centers when bombarded by an electron beam;

means for sweep scanning an electron beam over said screen layer;

an optical pen disposed in front of said electron tube for detecting light generated as said fluorescent material areas of said screen is scanned by the electron beam; and means for controlling the electron beam produced by said sweep scanning means in accordance with the output signal of said optical pen to switch the bombardment of the electron beam from said plurality of fluorescent material areas to said cathode chromic material area, to thereby display the trace of said optical pen on said face plate.

2. An image display system according to claim 1, wherein said sweep scanning means comprises one electron gun for producing one electron beam, and wherein the switching of the bombardment of the electron beam is effected by deflecting the electron beam for an instant and by changing the target position of the bombardment.

3. An image display system according to claim 1, wherein said sweep scanning means produces two electron beams, one of said electron beams being arranged to scan said plurality of fluorescent material areas and the other of said electron beams being arranged to bombard said cathode chromic material area adjacent to the scanned fluorescent area, and wherein said other electron beam is produced only when said optical pen produces an output.

4. An image display system according to claim 1, wherein said plurality of fluorescent material areas on the face plate of said electron tube are formed in the shape of stripes disposed in parallel with the direction of horizontal scanning of said beam.

5. An image display system according to claim 1, wherein said plurality of fluorescent material areas are formed in the shape of dots.

6. An image display system according to claim 1, wherein said sweep scanning controlling means includes an amplifying circuit for effecting positive feedback of the output of said optical pen thereto thereby to increase the intensity of the electron beam and to cause color luminescence of said cathode chromic material.

7. An interstation image display system for transmitting and receiving a displayed image between at least two image display stations connected by a communication line, each of the image display stations comprising:

an image display system including; an electron tube having a face plate provided on the inner side thereof with a screen layer, said screen layer composed of a plurality of fluorescent material areas enclosed by a cathode chromic material area, said cathode chromic material producing color centers when bombarded by an electron beam, means for sweep-scanning said screen layer, an optical pen disposed in front of said electron tube for detecting light generated as said fluorescent material area of said screen is scanned by the electron beam, and means for controlling said sweep scanning means in accordance with the output signal of said optical pen to switch the bombardment of the electron beam from said plurality of fluorescent material areas of said cathode chromic material area to thereby display the trace of said optical pen on said face plate;

synchronizing means for achieving synchronization between said two image display stations;

demodulating and separating means connected to the corresponding means of the other image station through said communication line for demodulating and separating optical pen position signals, sync. signals and telephone signals; and an optical signal coupler connected to said means for controlling said scanning means and to said demodulating and separating means for selectively displaying only patterns produced from at least one of said stations.

* * * * *